United States Patent [19]

Arentzen

[11] Patent Number: 4,474,614
[45] Date of Patent: Oct. 2, 1984

[54] IMPURITY SEGREGATION IN COPPER BY CONTROLLED COOLING TREATMENT

[75] Inventor: Charles Arentzen, Tucson, Ariz.
[73] Assignee: Atlantic Richfield Company, Los Angeles, Calif.
[21] Appl. No.: 466,294
[22] Filed: Feb. 14, 1983
[51] Int. Cl.$^3$ ............................ C25B 11/04; C21D 8/00
[52] U.S. Cl. ......................................... 204/292; 148/3; 420/411; 420/432; 420/469; 420/499; 420/500; 204/106
[58] Field of Search .................... 148/3; 420/411, 432, 420/469, 499, 500; 204/292

[56] References Cited

U.S. PATENT DOCUMENTS

| | | | |
|---|---|---|---|
| 2,834,698 | 5/1958 | Newport | 148/3 |
| 2,976,192 | 3/1961 | Saarivirta | 148/160 |
| 3,227,644 | 1/1966 | Rutemiller | 204/197 |
| 3,659,644 | 5/1972 | DeBie | 164/326 |
| 3,863,703 | 2/1975 | Nishimura | 164/128 |
| 4,050,961 | 9/1977 | Knight | 148/32 |

OTHER PUBLICATIONS

Handbook of Nonferrous Metallurgy, II Recovery of the Metals, McGraw-Hill Book Company, Inc., 1945, pp. 220-225, edited by D. M. Liddell.
The Refining of Copper, McGraw-Hill Book Company, Inc., 1911, pp. 531-577, by E. D. Peters.

Primary Examiner—John F. Niebling

[57] ABSTRACT

A process for the formation of copper anodes useful in the electrorefining of copper. Molten partially refined copper is subjected to controlled cooling such that the impurities coalesce into larger agglomerations and in the resulting solid partially refined copper are found segregated at the boundaries of the copper crystals. These larger agglomerations are less susceptible to dissolution in the electrolyte and to deposition or entrainment at the cathode. The process allows the use of a less refined copper starting material to achieve a comparable final cathode copper product.

16 Claims, No Drawings

IMPURITY SEGREGATION IN COPPER BY CONTROLLED COOLING TREATMENT

FIELD OF THE INVENTION

The present invention relates to a method for segregating impurities found in partially refined copper. More particularly, the invention is directed toward controlling the cooling of molten fire refined copper used to prepare the copper anodes utilized in the electrorefining of copper.

BACKGROUND OF THE INVENTION

Impurities remaining in partially refined copper manufactured by typical metallurgical processes make it unacceptable for certain uses. Electrorefining, the purification of metals by electrolysis, has been used to remove remaining impurities such as bismuth, tellurium, arsenic and antimony and to recover any gold or silver sometimes associated with the copper.

In electrorefining, the metal sought to be refined is used as the anode, or positive electrode of the electrochemical process. Placed in an appropriate electrolyte solution and subjected to a weak electric current, the copper anode is gradually consumed. The copper ions go into solution, migrate through the electrolyte, and collect at the negative electrode or cathode where they are deposited as essentially pure copper, called electrolytic cathode copper.

One problem with the electrorefining process is that impurities associated with the partially refined copper anode may become dissolved or suspended in the electrolyte and collect at the cathode to contaminate the desired pure copper. If the copper used to form the anode is too impure, the electrorefined copper will still contain too many contaminants. Even very small amounts of impurities on the order of several ppm or less make the electrorefined cathode copper unacceptable for certain applications. The problem caused by the impurities carried along with the copper cathode may necessitate the costly and time consuming recycling through the anode casting and electrolysis process in order to achieve a copper product of acceptable purity.

Copper anodes used in electrorefining are ordinarily rapidly cooled after being cast. Fire refined copper, or a similar partially refined copper, is cast into anode molds and immediately flooded with water after solidification. The anode is then immersed in water for final quenching. U.S. Pat. No. 3,227,644 and U.S. Pat. No. 4,050,961 disclose rapid cooling methods for preparing metal anodes. Anodes prepared by the usual rapid cooling processes have a rather homogeneous structure, i.e. they contain impurities as discrete particles highly dispersed in the matrix of the dominant metal or as a solid solution in the dominant metal. It is thought that rapid cooling from the liquid to solid state does not permit time for the impurities to migrate within the molten mass and segregate from the copper. Further, rapid cooling in the solid state prevents precipitation and coalescing of impurities in solid solution. When such an anode is used in the electrorefining process, the finely divided impurities contained within it are more easily dissolved and suspended in the electrolyte solution increasing the likelihood of their deposition and entrainment at the cathode to contaminate the copper being refined.

It is thus one object of the instant invention to prepare a copper anode from which a smaller amount of the impurities dissolve and/or become suspended in the electrolyte to cause contamination of the cathode.

Another object of the invention is to formulate an anode which can utilize copper containing more than the usual allowable amount of impurities and yet yield an acceptable electrorefined copper product.

SUMMARY OF THE INVENTION

The foregoing objects are accomplished by this invention which discloses a method for forming anodes from partially refined copper for use in an electrorefining process. Specifically, the invention comprises controlling the steps by which molten fire refined copper is cooled and is changed from the molten to the solid state.

When the metal anode is formed according to the process of the present invention whereby the cooling of the molten metal is controlled, the dominant metal, copper, forms coarse grained crystals surrounded by concentrated areas or agglomerations of the impurities at the crystal boundaries. That is, during the controlled cooling process, impurities precipitate out of solid solution and coalesce along the crystal boundaries of the copper, as a phase separate from the dominant metal. During electrolysis, these coarse particles of impurities fall more rapidly to the bottom of the electrolytic cell than the finely dispersed impurities of the quick cooled prior art anodes, and dissolve in the electrolyte more slowly because of their reduced surface area. Because fewer impurities are dissolved in the electrolytic solution, a cathode copper of greater purity can be produced, even from an anode containing a higher concentration of impurities then would normally be possible.

DESCRIPTION OF THE PREFERRED EMBODIMENT

As indicated above, the present invention is particularly directed toward formation of anodes comprised of partially refined copper. Copper anodes thus produced, are to be utilized in a further electrorefining process to achieve copper of a degree of purity of approximately 99.97%, or, containing impurities in an amount less than approximately 90 parts per million (excluding oxygen).

Typically, the partially refined copper utilized in the formation of the copper anodes is first refined by a fire refining process comprising methods known to those skilled in the art. "Practice of Copper Smelting" by E. D. Peters, McGraw-Hill Brook Company, Inc., 1911 pp. 531-577. The copper thus produced often contains desirable metals, often precious metals, sought to be recovered through the electrorefining process. Such metals, e.g. gold and silver, are typically found in amounts of between approximately 0.5 ounces per ton and approximately 50 ounces per ton in the partially refined copper. Desirable metals are recovered by treating the slimes that collect in the bottom of the electrolytic cell, "Handbook of Nonferrous Metallurgy, II Recovery of the Metals" edited by D. M. Liddell, McGraw-Hill Book Company, Inc., 1945 pp. 220-225 and partially offset the cost of electrorefining.

Harmful impurities are also found in fire refined copper, and include elements such as bismuth, tellurium, arsenic, antimony, selenium, lead, and nickel. These contaminants are typically found in amounts of from approximately 0.001% to approximately 0.2% of the copper present.

The general process of casting the anodes is one known to those skilled in the art. The apparatus employed in the practice of the method of the present invention is of a generally conventional type found in many metal casting operations, and includes a conventional furnace or melting pot, a pouring ladle and a mold forming an internal cavity. More recently continuous casting of anodes has been developed. This consists of casting a continuous slab of copper which is then sheared into anodes.

The furnace is of a general type suited to heating the fire refined copper to a molten condition at a temperature range of approximately 1120° to approximately 1150° C. After processing the metal by conventional fire refining techniques, the molten metal is poured into the mold which is then subjected to controlled cooling described herein.

The mold containing the molten metal is typically first allowed to air cool until the melt has completely solidified or to a temperature of approximately 1080° C. After solidification a cooling rate of approximately 20° C. per minute or less is operative for the initial cooling; however, it is preferred that a cooling rate of approximately 6° C. per minute be employed. These cooling rates may be obtained by utilizing a controlled application of spray water to the anode molds and to the anode itself if required. In some cases, an insulation layer may be applied to cover the solidified anode to retard the cooling to the desired rate. The actual requirements are related to the casting method employed and the impurities present in the copper.

When the anode has been cooled to the optimum temperature the desired impurity segregation has been substantially achieved, and the crystalline structure of the solid metal has been formed. At this point, there is no additional advantage to be gained from further controlled cooling. The anode may be allowed to air cool to ambient temperature. Alternatively, cooling of the anode may be quickly completed by quenching in a water bath or by any other similar quick cooling process such as by an air blast.

The completed anode may then be utilized in a normal electrorefining process.

Similarly, anodes which have not been prepared by controlled cooling may be heat treated to achieve the same impurity segregation and coalescing. For example, reheating the anodes to approximately 1050° C. followed by controlled cooling of 20° C. or less per minute to the optimum temperature will achieve the desired precipitation, segregation and coalescing of the impurities.

As will be known and understood by those skilled in the art, these and other modifications may be practiced without departing from the scope of the subject invention which is limited only by the appended claims.

What is claimed is:

1. A method of treating molten partially refined copper containing impurities to produce solidified partially refined copper comprising controlling the cooling of said molten partially refined copper to concentrate impurities in discrete areas within the solidified partially refined copper, said controlled cooling being for a time period sufficient to form coarse grained cyrstals of copper and for said impurities to concentrate at the boundaries of said coarse grained copper crystals.

2. The method of claim 1 wherein the partially refined copper is fire refined copper.

3. The method of claim 1 wherein the solidified partially refined copper is in the form of an anode useful for electrorefining.

4. The method of claim 1 wherein the cooling rate is less then 20° C. per minute.

5. The method of claim 1 wherein the cooling rate is about 6° C. per minute.

6. A method of forming copper anodes for use in electrorefining such that impurities within the partially refined copper form collections of particles in discrete areas within the solidified copper anode comprising:
   a. casting the molten partially refined copper into an anode mold; and,
   b. controlling the cooling of the molten, partially refined copper after it achieves the solid state, said controlled cooling being for a time period sufficient to form coarse grained crystals of copper and for said impurities to concentrate at the boundaries of said coarse grained copper crystals.

7. The method of claim 6 wherein the partially refined copper used to form the anode is fire refined copper.

8. The method of claim 6 wherein the molten partially refined copper comprises an anode which has been heated until molten.

9. In a method for preparing a copper anode useful in the electrorefining of copper, wherein partially refined copper containing impurities is cast into a mold, the improvement comprising controlling the cooling of said partially refined copper, such that an anode is produced having impurities concentrated in discrete areas within the solid partially refined copper and coarse grained crystals of copper are found within the solid.

10. The method of claim 9 wherein the cooling of the partially refined copper is at a rate of less than about 20° C. per minute.

11. The method of claim 9 wherein after said cooling the impurities present in the partially refined copper are concentrated at the boundaries of said coarse grained crystals formed by the copper.

12. The method of claim 9 wherein the partially refined copper is fire refined copper.

13. An improved partially refined copper anode useful for electrorefining to refined copper in an electrolytic cell comprising an impurities-containing copper anode made according to the method of claim 1.

14. An improved partially refined copper anode characterized by the presence of coarse grained crystals of copper and impurities concentrated in discrete areas therein.

15. An anode according to claim 14 wherein upon dissolution of said anode during electrorefining, said impurities concentrate at the bottom of said electrolytic cell.

16. A method according to claim 6 wherein said cooling is at a rate of less than about 20° C. per minute.

* * * * *